United States Patent [19]

Esposito

[11] Patent Number: 4,854,531
[45] Date of Patent: Aug. 8, 1989

[54] THREE LEGGED WORKBENCH

[76] Inventor: Joseph R. Esposito, 315 Greenway Ave., Syracuse, N.Y. 13206

[21] Appl. No.: 231,829

[22] Filed: Aug. 12, 1988

[51] Int. Cl.[4] .......................................... F16M 11/00
[52] U.S. Cl. .................................. 248/165; 248/188; 248/188.1; 182/151; 182/181; 403/403; 108/157
[58] Field of Search ................... 248/165, 188.1, 188.8, 248/188, 220.1; 108/157; 403/403, 205, 382, 231; 182/181, 185, 224, 151

[56] References Cited

U.S. PATENT DOCUMENTS

| 110,013 | 12/1876 | Congle | 248/188 |
|---|---|---|---|
| 323,705 | 8/1885 | Maunder . | |
| 1,577,724 | 3/1926 | Jenkins | 248/165 |
| 1,774,548 | 9/1930 | Feeny | 403/403 |
| 1,957,362 | 5/1934 | Smith . | |
| 2,022,229 | 11/1935 | Lehman | 248/165 |
| 2,039,125 | 4/1936 | Stuart | 403/231 |
| 2,084,758 | 6/1935 | Anderson | 403/231 |
| 2,657,964 | 11/1953 | Watrous | 408/157 |
| 2,931,129 | 4/1960 | Boniface | 403/403 |
| 3,103,374 | 9/1963 | Portnoy | 108/157 X |
| 3,836,270 | 9/1974 | Chambers | 403/205 X |
| 3,887,288 | 6/1975 | Glaser | 248/188.1 |
| 3,925,954 | 12/1975 | Snow et al. | 403/403 |
| 3,967,908 | 7/1976 | Snow et al. . | |
| 3,988,872 | 11/1976 | Adamson et al. . | |
| 4,011,726 | 3/1977 | Cooper, Jr. | 403/382 X |
| 4,181,292 | 1/1980 | Hubel . | |
| 4,186,716 | 2/1980 | Baker et al. | 248/165 X |
| 4,200,406 | 4/1980 | Fuss | 403/231 |
| 4,214,841 | 7/1980 | Hayashi | 403/231 X |
| 4,267,682 | 5/1981 | Fowler et al. | 403/231 X |
| 4,421,434 | 12/1983 | Magner | 403/403 X |
| 4,494,627 | 1/1985 | Arent . | |
| 4,645,161 | 2/1987 | Collins . | |
| 4,712,942 | 12/1987 | Brown | 403/403 X |

FOREIGN PATENT DOCUMENTS 517703 3/1953 Belgium .............................. 403/231

Primary Examiner—Alvin C. Chin-Shue
Attorney, Agent, or Firm—Wall and Roehrig

[57]   ABSTRACT

A collapsible workbench made up of three similar sections that are connected in assembly to form a three legged frame capable of supporting a flat panel or the like thereon.

7 Claims, 2 Drawing Sheets

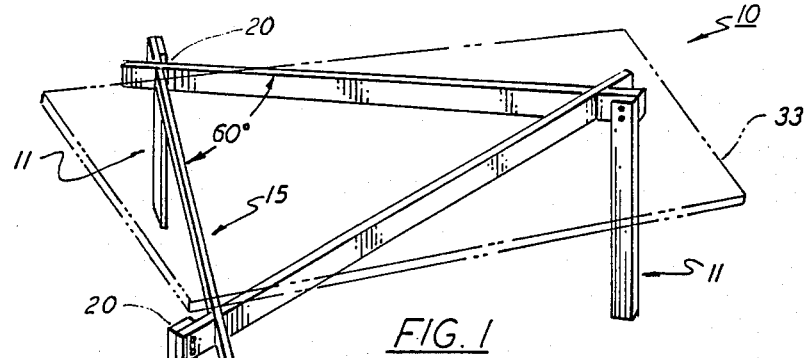
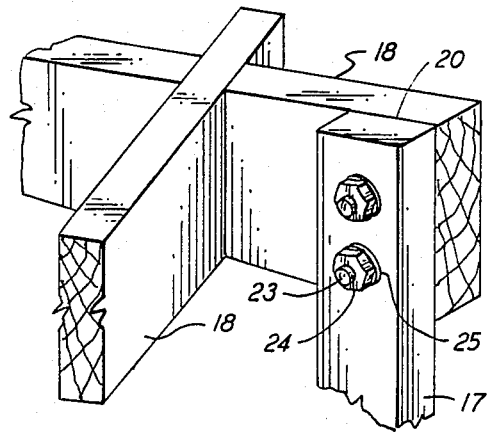
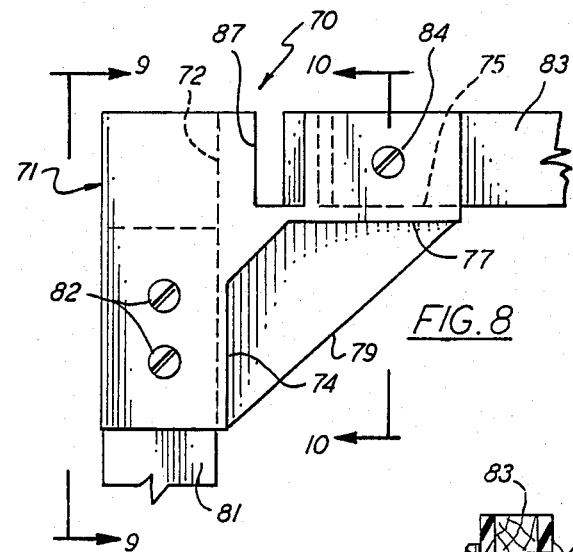
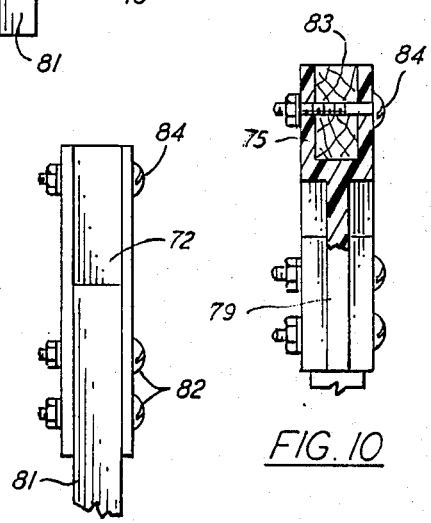
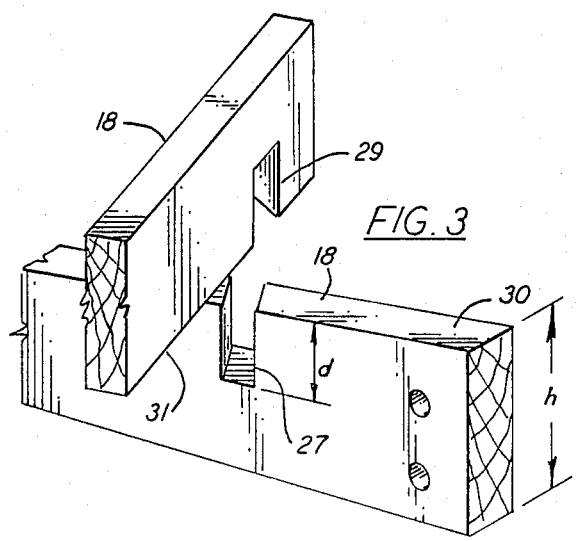

THREE LEGGED WORKBENCH

BACKGROUND OF THE INVENTION

This invention relates to a workbench and, in particular to a workbench having a three legged support frame that can be quickly and easily assembled and disassembled for ease of transportation and storage.

Most transportable work benches used by carpenters and other artisans whose work takes them to remote locations, generally consist of two four legged saw horses over which is placed a flat wooden panel which provides a working surface. Although, this type of bench can be easily erected and broken down at a work site, the assembled bench is generally unstable even when the saw horses are seated on a solid flat surface such as a concrete floor or the like. Each saw horse has four legs making a total of eight legs supporting the bench. If any of the eight legs is not securely resting on a support surface, the entire bench assembly will wobble when placed in use. Under certain loading conditions the bench may collapse and thus endanger the user, particularly where he or she is using a power tool. Although the bench can be broken down into three separate sections, each sawhorse is relatively bulky and therefore, difficult to store or load in the back of a truck.

Collins in U.S. Pat. No. 4,645,161 describes a collapsible four legged workbench that includes two spaced apart metal leg sections containing a pair of legs. The leg sections are attached to a central beam by a hinged bracket that enables each leg sections to be folded inwardly against the beam for ease of storage and/or transportation. Although the Collins work table represents an improvement over the conventional sawhorse assembly in that the number of support legs is reduced from eight to four, the four legged configuration still does not furnish the all around stability required by most skilled workmen. Again, the four legged bench like the eight legged counterpart can only be safely erected on a very flat and smooth support surface. Furthermore, the hinged bracket used by Collins becomes worn with time and use and thus can weaken to a point where the bracket fails. The bench typically collapses when it is being used and such failure can lead to injuries.

Arent, in U.S. Pat. No. 4,494,627 described a three legged sawhorse. The sawhorse consists of a horizontal beam having two inclined legs attached to one end and a single leg attached to the other end. The sawhorse, however, cannot be broken down and the beam provides the user with only a limited amount of working area.

SUMMARY OF THE INVENTION

It is therefore an object of the present invention to improve work benches that are used by carpenters and the like.

It is a further object of the present invention to provide a frame for a portable work bench that will provide a stable support platform when seated upon rough or uneven terrain.

It is a still further object to provide a collapsible workbench that can be quickly erected to provide an extremely stable and strong platform upon which a craftsman can safely work.

Another object of the present invention is to provide a collapsible workbench that can be broken down into flat planar components for each of storage and transportation.

These and other objects of the present invention are attained by means of a workbench that includes a frame having three interlocking sections. Each section has a vertical leg and a horizontal beam that is joined at its proximal end to the top of the leg to form a right angle corner. The beam contains a first notch that is located adjacent to the corner and a second notch that is located near its distal end. Each notch has a width slightly greater than the width of the beam. The first corner notch is passed downwardly through the top of the beam to a depth that is equal to about one-half the height of the beam, while the second end notch is passed upwardly through the bottom of the beam to a depth that its also equal to one-half the beam height. The notches are angularly disposed in regard to the longitudinal axis of the beam so that the planes described by the notches form a triangle with the longitudinal axis of the beam. To assemble the frames, the end notch of each section is passed into the corner notches of another section to create a three legged structure. A flat panel is mounted on top of the interlocked beams to complete the assembly.

In another form of the invention, each section contains a corner bracket for slidably receiving the adjacent ends of the vertical leg and the horizontal beam therein. The bracket also has a notch formed therein that has a width slightly greater than the width of the beam and a depth equal to the height of the beam. The notch forms an angle of about sixty degrees with one side wall of the bracket so that the distal end of a beam contained in one section can be slipped in a notch formed in another section to form a three legged support frame.

BRIEF DESCRIPTION OF THE DRAWING

For a better understanding of these and other objects of the present invention, reference is made to the following detailed description of the invention which is to be read in association with the accompanying drawings, wherein FIG. 1 is a perspective view showing one embodiment of a workbench embodying the teachings of the present invention;

FIG. 2 is an enlarged partial perspective view showing the corner region of the frame used in the workbench shown in FIG. 1;

FIG. 3 is a partial exploded perspective view showing the construction of the two interlocking beams used in the frame shown in FIG. 1;

FIG. 8 is a side elevation of a second bracket suitable for use in the frame shown in FIG. 4;

FIG. 9 is an end view taken along lines 9—9 in FIG. 8; and

FIG. 10 is a section taken along line 10—10 in FIG. 8.

DESCRIPTION OF THE INVENTION

Figure 4:
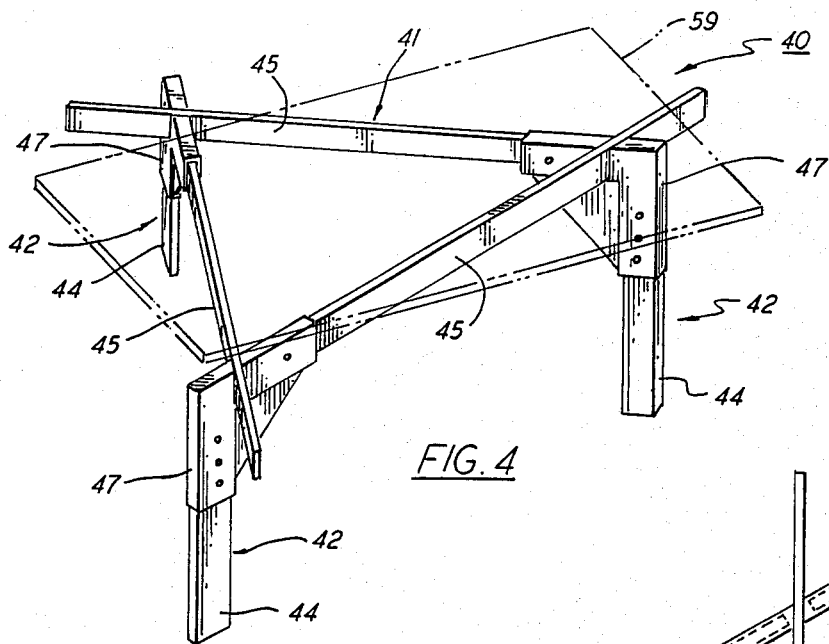
FIG. 4 is a perspective view showing a second embodiment of the present invention wherein each section of the frame is equipped with a corner bracket for supporting a leg member and a beam member therein.

Turning initially to FIGS. 1-3, there is illustrated a collapsible workbench, generally referenced 10, of the type typically used by carpenters or other skilled craftsmen. The bench includes three interlocking right angle sections 11—11 that are brought together in assembly to form a three legged support frame 15. Each section includes a vertically disposed leg 17 that is secured to a horizontally disposed beam 18 to form a right angle corner depicted at 20. Although the leg 17 and beam can be fabricated from any suitable material, the two members preferably are formed of standard size pieces of lumber such as 2×4 sections or 2×8 sections that are readily available in all lumber yards. As shown in FIG. 2, the two wooden members are secured at the corner by means of bolts 23 and nuts 24. A washer 25 is placed beneath each nut.

Each beam 18 contains a pair of angularly disposed notches that include an upper notch 27 which is situated adjacent the section corner and a spaced apart lower notch 29 that is positioned near the distal end of the beam. The upper or corner notch has a width that is slightly greater than the width of the beam and is cut downwardly at an angle through the top surface 30 of the beam to a depth (d) that is substantially equal to half the height (h) of the beam. The lower or end notch 29 is cut upwardly at an angle through the bottom surface 31 of the beam to a depth that is also substantially equal to half the height of the beam. The width of each notch is slightly greater than the width of the beam so that the end notch of one beam can be interlocked in the corner notch of a second beam as shown in FIGS. 2 and 3.

The notches are cut into the beam at a desired angle with regards to the longitudinal plane of the beam. The plane described by each notch forms an interior angle of about 60 degrees with the plane of the beam. As best illustrated in FIG. 1, the three sections of the frame are assembled by slipping the end notch of a beam contained in one section into the corner notch of a beam contained in a second section. The third section is then similarly connected to the two interlocked sections thus closing the assembly to create a three legged frame. A flat panel 33 is laid over the beams to provide a working surface and thus complete the bench. The panel can be removably secured to the frame by any type of suitable fastening means, such as locking pins and the like.

As can be seen, the three legged bench of the present invention can be easily assembled and broken down thus making it easily transported from one job site to another. The component parts of the bench are all flat planar sections which, when broken down, can be easily stored or placed in a truck in a stacked configuration requiring a minimum amount of space. Furthermore, because the assembled bench utilizes three legs, it can be erected and safely employed on any type of uneven surface without fear of the bench wobbling or tipping over.

Turning now to FIGS. 4-7, there is shown a second embodiment of the invention. Here again the bench, generally referenced 40, contains a frame 41 that is formed by three interlocking sections 42—42. Each section further includes a vertically disposed leg 44 and a horizontally disposed beam 45 that are slidably contained within a corner bracket 47. The corner bracket is cast of metal or molded of plastic to the configuration shown in FIG. 6.

Figure 7:
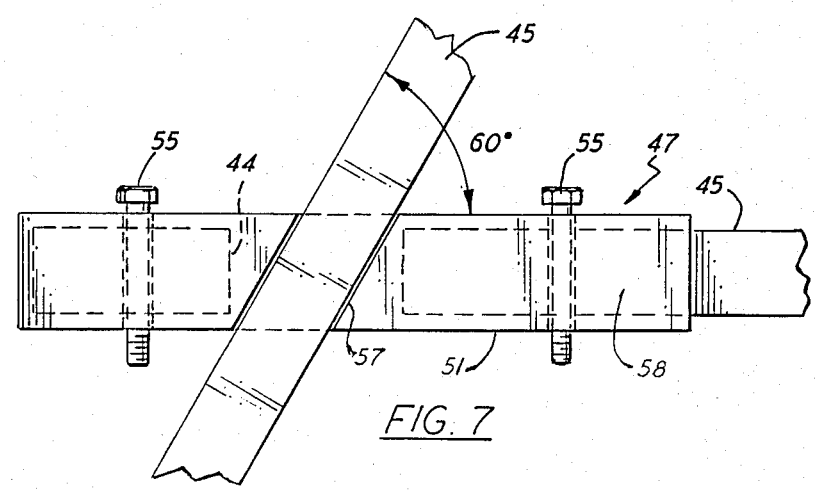
FIG. 7 is an enlarged top view of the bracket shown in FIG. 6 further showing a beam mounted therein.

Each bracket includes a pair of perpendicularly aligned rectangular shaped hollow tubular members 50 and 51 that are aligned to form a right angle corner. A gusset 53 is located at the inside of the corner which connects the two members and provides additional strength to the bracket. The bottom end of vertical member 50 is open so that a leg 44 (FIG. 4) can be slidably received therein. Similarly, the outer end of the horizontal member 51 is also open so that a beam 45 can be inserted therein. Holes 54—54 pass through the sidewalls of the members. As seen in FIG. 7, locking pins 55—55 are passed through the holes to hold the legs and the beams in assembly. A hole is provided in each leg and beam to permit them to be aligned within the bracket. The vertical member contains a series of spaced pin receiving holes which enables the length of the leg to be adjusted in assembly so that the height of the frame can be set at a desired elevation.

An angularly disposed notch 57 is formed in each corner bracket for slidably receiving therein the distal end of a beam connected at its other end in a second bracket. The notch has a width slightly larger than the width of the beam and is passed downwardly through the top wall 58 of the bracket to a depth about equal to the depth of the beam. The notch is set at an angle of about 60 degrees (FIG. 7) with one of the side walls of the bracket, and is positioned at the back of the horizontal member adjacent to the vertical member.

Figure 5:
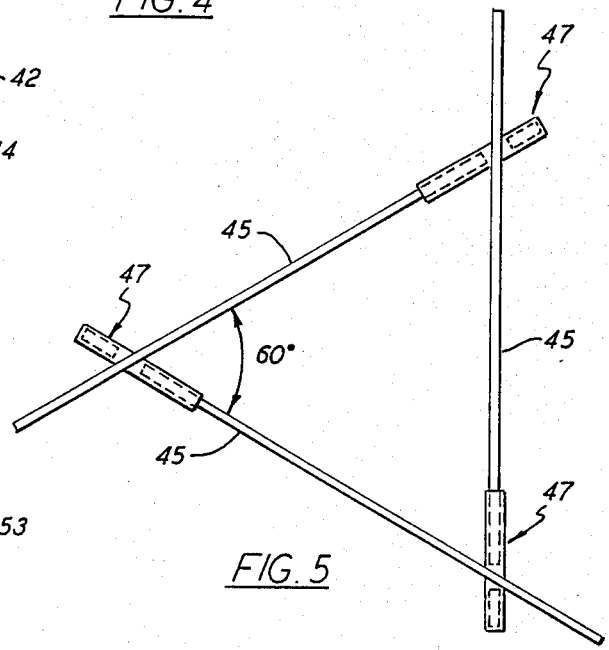
FIG. 5 is a top view of the bench shown in FIG. 4.
Figure 6:
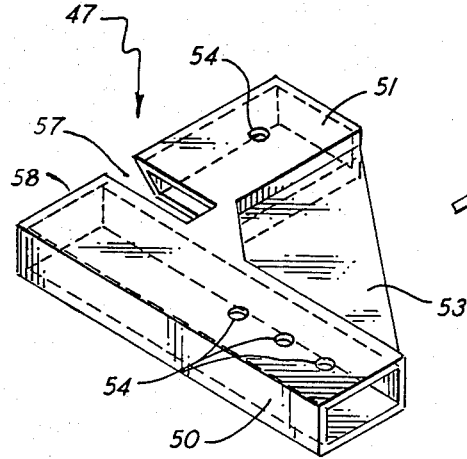
FIG. 6 is an enlarged perspective view of the corner bracket utilized in the bench illustrated in FIG. 4.

As best seen in FIGS. 4 and 5, the three sections making up the frame are easily assembled by simply slipping the distal end of one beam into a notch provided in the bracket of a second section. When the frame is assembled, a flat panel 59 is laid over the beams and clamped in place to complete the bench assembly. Here again, the bench can be easily broken down and the sections easily stacked for storage or transporting. Removal of the legs and beams from the corner bracket will further reduce the amount of room required to store the component parts of the bench. It should be further noted that the size of the frame assembly can be adjusted by simply sliding the beams laterally in the bracket notches to selectively increase or decrease the size of the triangle formed by the three frame sections. The size of the frame can thus be adjusted to accommodate different size work elements such as doors, window frames, cabinets and the like.

Another type of corner bracket 70 suitable for use in the present invention is depicted in FIGS. 8-10. The bracket contains a right angle body 71 having an open sided vertical arm 74 and an open sided horizontal arm 77. The two arms are connected by a support gusset 79. A leg 81 is inserted into the vertical channel 72 formed in arm 74 and is held in place by suitable fasteners 82—82. A beam 83 is inserted into the vertical slot 75 of arm 77 and held in place by means of fastener 84. A rectangular notch 87 is formed in the top horizontal arm 77 behind the channel 75. The notch is formed at a 60 degree angle with one side wall of the bracket and dimensioned as described above to receive the distal end of a beam therein. The three sections making up the triangular frame are connected in assembly by simply sliding the beam of one section into the corner bracket of another section.

While this invention has been explained with reference to the structure disclosed herein, it is not confined to the details set forth and this application is intended to cover any modifications and changes as may come within the scope of the following claims.

What is claimed is:

1. A workbench having an adjustable three legged support frame consisting of three interlocking leg and beam sections, each interlocking section including;
- a corner bracket that includes a pair of perpendicularly aligned hollow arms, said arms comprising a vertical disposed arm having an opening for receiving a leg member therein and horizontally disposed arm having an opening for receiving a beam member therein;
- a leg member removably received in said vertically disposed bracket opening so that the leg stands upright on a support surface;
- a beam member removably received in said horizontally disposed bracket opening;
- an angularly disposed open top notch passing downwardly through the top of said corner bracket a depth equal to the height of a beam member and forming an angle of 60 degrees with one side wall of the corner bracket to allow the distal end of a second beam member to be slidably received so that three of said leg and beam sections can be joined in assembly to form an adjustable triangular workbench frame by placing one end of a beam member in the horizontal arm of each bracket and the other end of each beam member in the notch of another bracket and a leg member in the vertical arm of each bracket.

2. The workbench of claim 1 wherein the leg and the beam of each section is a rectangular shaped member.

3. The workbench of claim 1 further including removable fastening means for securing the leg and the beam in the corner bracket of each section.

4. The workbench of claim 1 wherein the corner bracket is formed from a single piece of high strength material.

5. The workbench of claim 1 wherein each section further includes adjusting means for setting the length of the leg with respect to the bracket.

6. The workbench of claim 2 wherein each corner bracket includes a pair of perpendicularly aligned hollow arms having rectangular shaped openings formed therein for slidably receiving said members therein.

7. The workbench of claim 1 that further includes a flat panel mounted on top of the connected sections.

* * * * *